US011597262B2

(12) United States Patent
Cha et al.

(10) Patent No.: US 11,597,262 B2
(45) Date of Patent: Mar. 7, 2023

(54) CONNECTION SYSTEM FOR HOUSE AND VEHICLE (71) Applicants: Hyundai Motor Company, Seoul (KR); Kia Corporation, Seoul (KR)

(72) Inventors: Dong Eun Cha, Hwaseong-si (KR); Jin Ho Hwang, Seoul (KR); Sang Heon Lee, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/674,228

(22) Filed: Feb. 17, 2022

(65) Prior Publication Data
US 2022/0169098 A1 Jun. 2, 2022

Related U.S. Application Data (62) Division of application No. 16/540,406, filed on Aug. 14, 2019, now Pat. No. 11,285,788.

(30) Foreign Application Priority Data

Apr. 10, 2019 (KR) .......................... 10-2019-0041805

(51) Int. Cl.
*E04H 1/00* (2006.01)
*E04H 6/42* (2006.01)
(Continued)

(52) U.S. Cl.
CPC ........... *B60J 5/0477* (2013.01); *B60J 5/0473* (2013.01); *B60J 5/0486* (2013.01); *B60J 5/06* (2013.01);
(Continued)

(58) Field of Classification Search
CPC .. E04H 6/02; E04H 6/42; E04H 6/426; E04H 1/00; E04H 1/02; E04B 1/3444; E06B 3/38
See application file for complete search history.

(56) References Cited

U.S. PATENT DOCUMENTS 1,153,292 A    9/1915  Downey
2,840,866 A    7/1958  Paulsen
(Continued)

FOREIGN PATENT DOCUMENTS

DE    10 2016 209 099 A1    7/2017
JP    2000-289520 A          10/2000
(Continued)

OTHER PUBLICATIONS

Extended European Search Report, dated Jan. 30, 2020, for European Patent Application No. 19191710.3.
(Continued)

*Primary Examiner* — Christine T Cajilig
(74) *Attorney, Agent, or Firm* — Morgan, Lewis & Bockius LLP (57) ABSTRACT A connection system for a house and a vehicle, may include a vehicle door provided in the vehicle to open or close a vehicle entrance through which a passenger enters or exits the vehicle and allowing an internal space of the vehicle to be exposed into the house when authenticated by the house; and a hatch provided in a house entrance on a side wall of the house to selectively couple the house entrance and the vehicle entrance with each other so that an internal space of the vehicle and an internal space of the house are connected to each other in a state that the vehicle door is open when the authenticated vehicle is parked on a side of the house entrance.

5 Claims, 6 Drawing Sheets (51) Int. Cl.
  *B60J 5/04*    (2006.01)
  *B60J 5/06*    (2006.01)
  *E06B 3/38*    (2006.01)

(52) U.S. Cl.
  CPC ............... *E04H 1/00* (2013.01); *E06B 3/38* (2013.01); *E04H 6/42* (2013.01)

(56) References Cited

U.S. PATENT DOCUMENTS

| | | | | |
|---|---|---|---|---|
| 4,115,656 | A | * | 9/1978 | Aitel .................. H05K 9/0018 52/79.8 |
| 4,250,669 | A | | 2/1981 | Freeauf |
| 4,499,696 | A | | 2/1985 | Freeauf |
| 5,333,339 | A | * | 8/1994 | Larsen ............... B65G 69/2888 14/71.1 |
| 6,058,664 | A | | 5/2000 | Brownlee, III |
| 6,330,766 | B1 | | 12/2001 | Brownlee, III |
| 7,322,636 | B1 | | 1/2008 | Woodhouse |
| 8,969,105 | B2 | | 3/2015 | Hoisington et al. |
| 9,771,225 | B2 | | 9/2017 | Stone |
| 2019/0004487 | A1 | | 1/2019 | Yuzuwa et al. |
| 2020/0115915 | A1 | | 4/2020 | Tanaka |

FOREIGN PATENT DOCUMENTS

| | | |
|---|---|---|
| JP | 2013-018469 A | 1/2013 |
| WO | WO 2019/003334 A1 | 1/2019 |

OTHER PUBLICATIONS

Dave Pinter, *Hyundai's 'Mobility Vision' Has Cars Docking With Homes And Becoming Shared Living Spaces*, PSFK, Jan. 16, 2017, Retrieved from https://www.psfk.com/print-post?format=pds&id=176177060.

The Wheel Network, *Hyundai Mobility Vision CES 2017*, YouTube, Jan. 5, 2017. Retrieved from https://www.youtube.com/watch?v=AR7zw4H-e4U.

* cited by examiner

FIG. 6 ary application is a Divisional of U.S. patent application Ser. No. 16/540,406, filed Aug. 14, 2019, which claims priority to Korean Patent Application No. 10-2019-0041805 filed Apr. 10, 2019, the entire contents of which is incorporated herein for all purposes by this reference.

CONNECTION SYSTEM FOR HOUSE AND VEHICLE

CROSS REFERENCE TO RELATED APPLICATION

The present application is a Divisional of U.S. patent application Ser. No. 16/540,406, filed Aug. 14, 2019, which claims priority to Korean Patent Application No. 10-2019-0041805 filed Apr. 10, 2019, the entire contents of which is incorporated herein for all purposes by this reference.

BACKGROUND OF THE INVENTION

Field of the Invention

The present invention relates to a connection system for a house and a vehicle, by which an internal space of the vehicle and an internal space of the house are connected to each other when the vehicle is parked on a side of a house entrance.

Description of Related Art

Generally, vehicles have somewhat different sizes and shapes depending on a manufacture or a vehicle model, but most body parts of the vehicle are produced and provided in a fixed form under a defined interface. Most of these vehicles were used only as a means of transporting or carrying passengers or goods.

However, unlike vehicles in the related art, autonomous vehicles or electric vehicles have recently been produced so that vehicles having different sizes and shapes from those of the vehicles in the related art are manufactured, and the internal space of the vehicle is gradually expanding. The vehicles do not only serve as a means of transportation and conveyance, but also provide various convenient functions.

In view of the present tendency, it may be considered that the internal space of the vehicle can act as a medium providing a resting space or a living space, and the internal space of the vehicle may be expanded as a portion of the living space by combining the house and the vehicle.

Herein, for the internal spaces of the vehicle and the house to be connected to each other, the entrance of the vehicle and the entrance of the house may be connected to each other, but a technology relating to this has not been developed yet.

Therefore, to solve such a problem, there is a demand for a new concept of a connection system for a house and a vehicle.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a connection system of a house and a vehicle, by which an internal space of the vehicle and an internal space of the house are connected to each other when a vehicle is parked on a side of a house entrance.

In various aspects of the present invention, a connection system for a house and a vehicle according to an exemplary embodiment of the present invention may include a vehicle door provided in the vehicle to open or close a vehicle entrance through which a passenger enters or exits the vehicle and allowing an internal space of the vehicle to be exposed into the house when authenticated by the house; and a hatch provided in a house entrance on a side wall of the house to couple the house entrance and the vehicle entrance with each other so that the internal space of the vehicle and an internal space of the house are connected to each other when the vehicle door of the authenticated vehicle is opened in a side of the house entrance.

The hatch may include an upper hatch provided in an upper portion of the house entrance and a lower hatch provided in a lower portion of the house entrance, in which hatch is coupled the upper hatch is configured to be coupled to a top portion of the vehicle and hatch is coupled the lower hatch is configured to be connected to a bottom portion of the vehicle when the internal space of the vehicle and the internal space of the house are connected to each other.

The upper hatch and the lower hatch may open or close the house entrance, the upper hatch may be connected to the top portion of the vehicle by allowing a lower end portion thereof to be pivoted to open the upper portion of the house entrance, and the lower hatch may be connected to the bottom portion of the vehicle by allowing an upper end portion thereof to be pivoted to open the lower portion of the house entrance.

The upper hatch and the lower hatch may be inserted into the upper portion and the lower portion of the house entrance, respectively, and the upper hatch and the lower hatch may be slid outward to protrude from the house and thus connected to the top portion and the bottom portion of the vehicle, respectively.

The lower hatch may be slid outward to protrude from the house, the lower hatch is coupled to the bottom portion of the vehicle so that floor surfaces of the internal spaces of the vehicle and the house are continuously connected.

The vehicle door may be opened or closed in a butterfly type, and the upper hatch may be connected to the vehicle door in a state that the vehicle door is opened.

The upper hatch may be connected to an external surface of the vehicle door in a state that the vehicle door is opened.

The upper hatch may have a groove shape recessed into the house, and an internal portion of the upper hatch may be connected to the vehicle door in a state that the vehicle door is opened.

The vehicle door may be slid forwards and backwards with respect to a longitudinal direction of the vehicle to open or close the vehicle entrance, and the upper hatch may be connected to the top portion of the vehicle in a state that the vehicle door is opened.

The vehicle door may be slid upward and downward with respect to a vertical direction of the vehicle to open or close the vehicle entrance, and the upper hatch may be connected to the top portion of the vehicle in a state that the vehicle door is opened.

The system may further include an integrated control unit having a list of vehicles accessible to the house to perform authentication for a vehicle accessing the house, and performing control so that the hatch and the vehicle door are connected to each other when the vehicle is authenticated.

The system may further include an integrated control unit of designating a position in which the vehicle is disposed on a side of the house entrance so that the internal space of the vehicle and the internal space of the house are connected to each other and performing control so that the hatch and the vehicle door are connected to each other when the authenticated vehicle is disposed in the designated position.

According to the connection system for the house and the vehicle of the present invention, when the vehicle is parked on a side of the house entrance, the internal space of the vehicle and the internal space of the house may be connected to each other.

The internal space of the vehicle may be connected to the internal space of the house, forming a new space having a new function.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Figure 1:
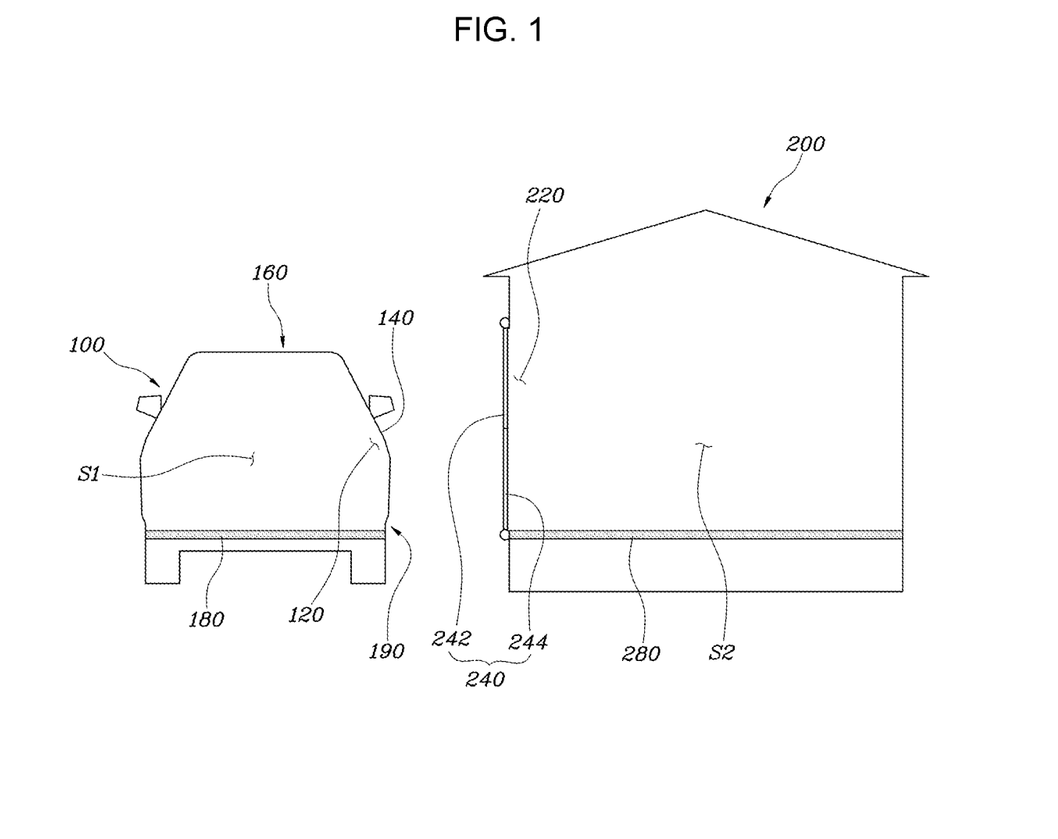
FIG. 1 is a view showing a state before a house and a vehicle are connected by a connection system for a house and a vehicle according to an exemplary embodiment of the present invention.
Figure 2:
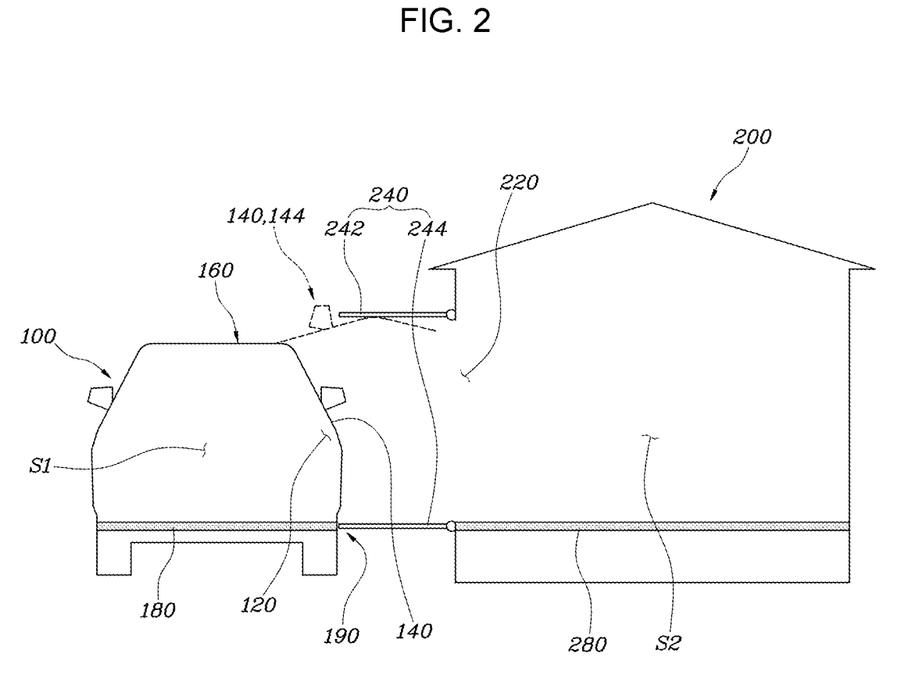
FIG. 2 is a view showing a state where a house and a vehicle are connected by a connection system for a house and a vehicle according to an exemplary embodiment of the present invention.
Figure 3:
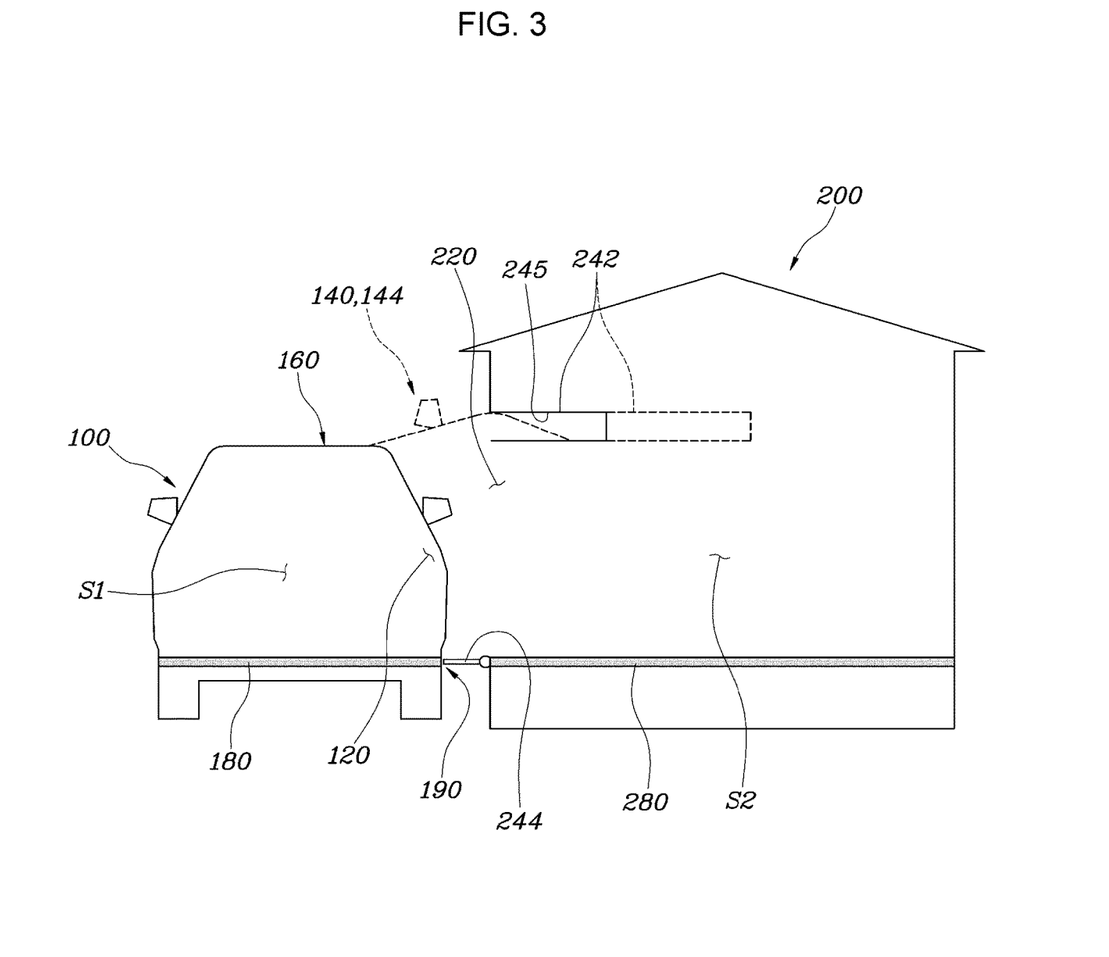
FIG. 3 is a view showing a state where a house and a vehicle are connected by a connection system for a house and a vehicle according to various exemplary embodiments of the present invention.
Figure 4:
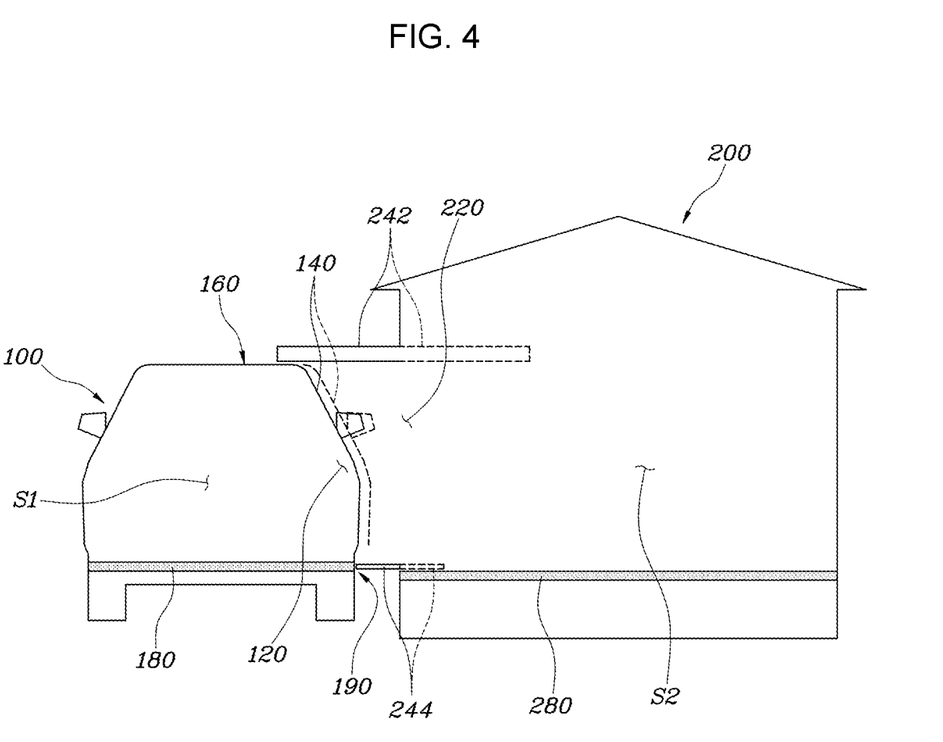
FIG. 4 is a view showing a vehicle having a forward-backward sliding type door in a connection system for a house and a vehicle according to various exemplary embodiments of the present invention.
Figure 5:
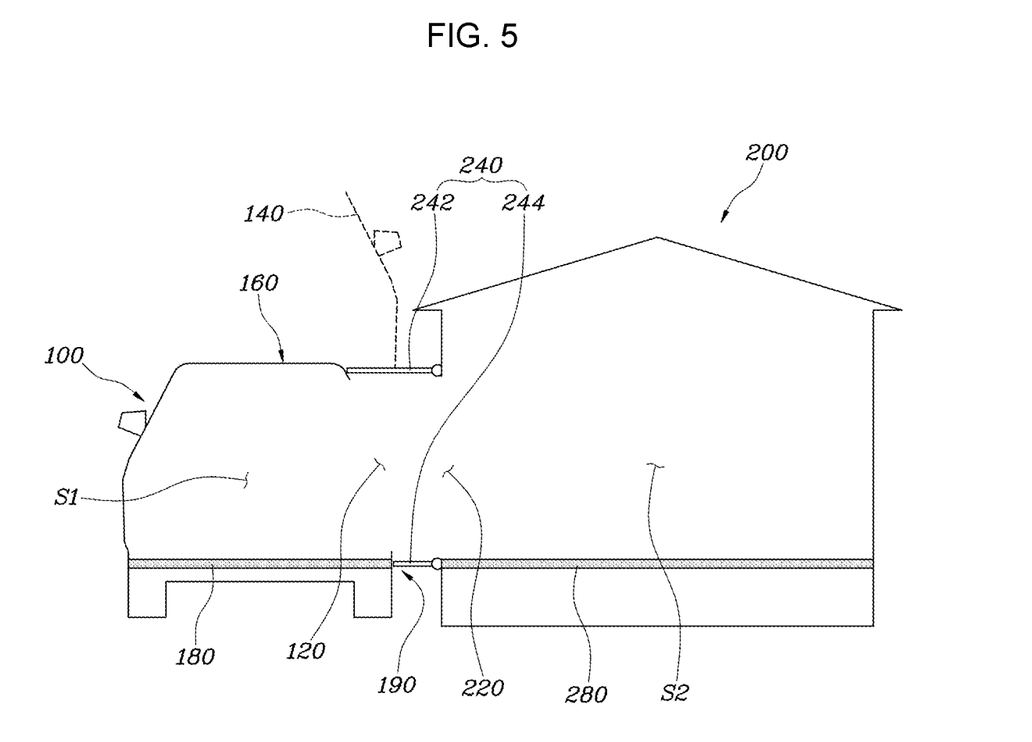
FIG. 5 is a view showing a vehicle having a vertically sliding type door in a connection system for a house and a vehicle according to various exemplary embodiments of the present invention.
Figure 6:
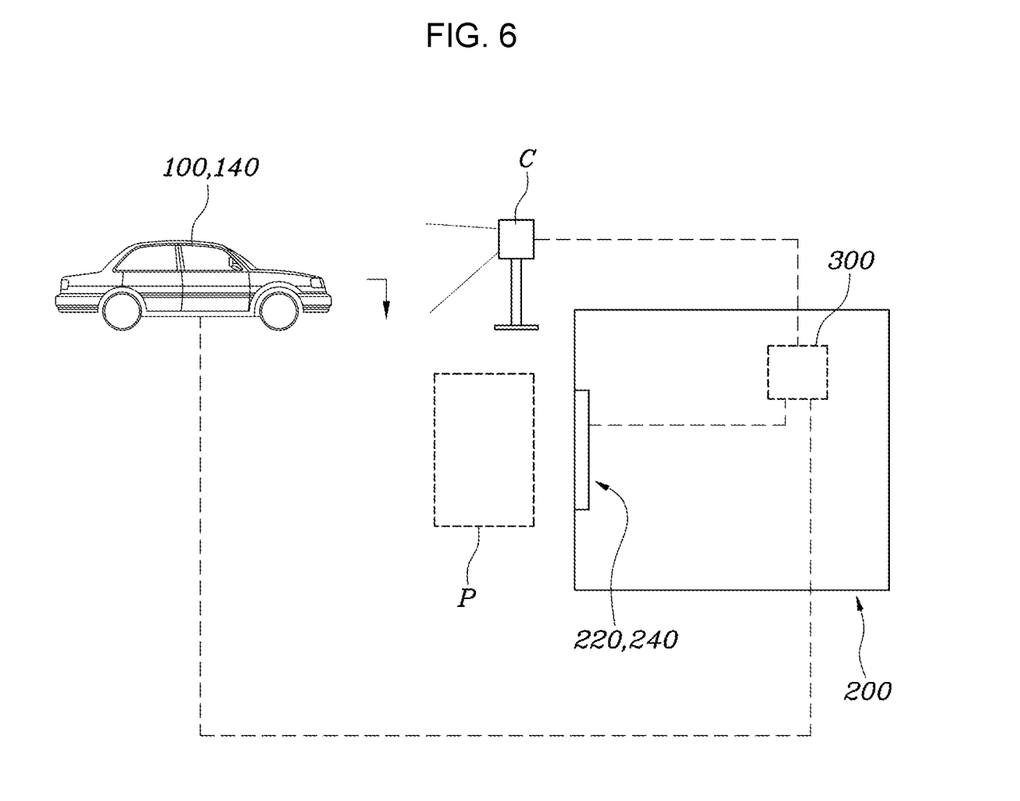
FIG. 6 is a view showing an integrated control unit in a connection system for a house and a vehicle according to an exemplary embodiment of the present invention.

FIG. 1 is a view showing a state before a house and a vehicle are connected by a connection system for a house and a vehicle according to an exemplary embodiment of the present invention; FIG. 2 is a view showing a state where a house and a vehicle are connected by a connection system for a house and a vehicle according to an exemplary embodiment of the present invention; FIG. 3 is a view showing a state where a house and a vehicle are connected by a connection system for a house and a vehicle according to various exemplary embodiments of the present invention; FIG. 4 is a view showing a vehicle having a forward-backward sliding type door in a connection system for a house and a vehicle according to various exemplary embodiments of the present invention; FIG. 5 is a view showing a vehicle having a vertically sliding type door in a connection system for a house and a vehicle according to various exemplary embodiments of the present invention; and FIG. 6 is a view showing an integrated control unit in a connection system for a house and a vehicle according to an exemplary embodiment of the present invention.

FIG. 1 is a view showing a state before a house and a vehicle are connected by a connection system for a house and a vehicle according to an exemplary embodiment of the present invention; and FIG. 2 is a view showing a state where a house and a vehicle are connected by a connection system for a house and a vehicle according to an exemplary embodiment of the present invention.

As shown in FIG. 1 and FIG. 2, a connection system for a house and a vehicle according to an exemplary embodiment of the present invention includes a door 140 of a vehicle 100 which is provided in the vehicle 100 to open or close a vehicle entrance 120 through which a passenger enters and exits and allows an internal space S1 of the vehicle 100 to be externally exposed when the vehicle is authenticated from the house 200; and a hatch 240 which is provided in a house entrance 220 on a side wall of the house 200 to allow the vehicle entrance 120 and the house entrance 220 to be connected to each other so that the internal spaces of the vehicle 100 and the house 200 are connected to each other in a state where the door 140 of the vehicle 100 is opened when the authenticated vehicle 100 is parked on a side of the house entrance 220.

As shown in FIG. 1 and FIG. 2, the house entrance 220 is provided according to an exemplary embodiment of the present invention. The house entrance 220 may include an additional entrance such as a verandah, a terrace, and a back door, in addition to the main entrance. As shown in FIG. 2, the connection system according to an exemplary embodiment of the present invention is a system of new concept in which an authenticated vehicle 100 is parked adjacent to the house 200, which is a residential space, and the vehicle entrance 120 is connected to the house entrance 220 on one-side wall of the house 200 so that the internal space S1 of the vehicle 100 and the internal space S2 of the house 200 are connected to each other. Accordingly, there are advantages that the passenger may directly enter from the vehicle into the house 200 without a need for the passenger to get off the vehicle 100, and the internal space S1 of the vehicle 100 is connected to the internal space S2 of the house 200 so that the usable area of the residential space is enlarged. Furthermore, there is an advantage that the vehicle may be charged through the house. In the instant case, an energy transmission and reception unit is provided in the vehicle and the house, respectively, to charge the vehicle, so that energy may be exchanged with each other when the vehicle is connected to the house.

Meanwhile, the connection system according to an exemplary embodiment of the present invention includes a hatch 240 which is provided in a house entrance 220 on a side wall of the house 200 to allow the vehicle entrance 120 to be connected to the house entrance 220 so that the internal space S1 of the vehicle 100 and the internal space S2 of the house 200 are connected to each other in a state where the door 140 of the vehicle 100 is opened when the authenticated vehicle 100 is parked on a side of the house entrance 220.

As shown in FIG. 4 and FIG. 5, the hatch 240 includes an upper hatch 242 provided in an upper portion of the house entrance 220 and a lower hatch 244 provided in a lower portion of the house entrance 220, in which the upper hatch 242 is coupled to a top portion 160 of the vehicle 100 and the lower hatch 244 is coupled to a bottom portion 190 of the vehicle 100 when the internal spaces of the vehicle 100 and the house 200 are connected to each other. Accordingly, the upper portion of the house entrance 220 is coupled to the top portion 160 of the vehicle 100 through the upper hatch 242 and the lower portion of the house entrance 220 is coupled to the bottom portion 190 of the vehicle 100 through the lower hatch 244, forming a passage through which the internal space S2 of the house 200 and the internal space S1 of the vehicle 100 are connected to each other.

Referring to FIG. 1, FIG. 2, FIG. 3, FIG. 4, and FIG. 5, the door 140 of the vehicle 100 represented by a solid line indicates a state in which the vehicle entrance 120 is closed, and the door 140 of the vehicle 100 represented by a dotted line indicates a state in which the vehicle entrance 120 is opened. As shown, the upper hatch 242 is coupled to the top portion 160 of the vehicle 100 in a state where the door 140 of the vehicle 100 opens the vehicle entrance 120.

Meanwhile, as shown in FIG. 1 and FIG. 2, the connection system for a house and a vehicle according to an exemplary embodiment of the present invention is provided so that the upper hatch 242 and the lower hatch 244 open or close the house entrance 220, the upper hatch 242 is coupled to the top portion 160 of the vehicle 100 by allowing a lower end portion thereof to be pivoted to open the upper portion of the house entrance 220, and the lower hatch 244 is coupled to the bottom portion 190 of the vehicle 100 by allowing an upper end portion thereof to be pivoted to open a lower portion of the house entrance 220.

The upper hatch 242 and the lower hatch 244 may be engaged with each other to close the house entrance 220 as shown in FIG. 1, and the upper hatch 242 and the lower hatch 244 may be disconnected from each other to open the house entrance 220 as shown in FIG. 2.

Furthermore, the upper hatch 242 is connected to the top portion 160 of the vehicle 100, and the lower hatch 244 is connected to the bottom portion 190 of the vehicle 100, forming a passage through which the internal space S1 of the vehicle 100 and the internal space S2 of the house 200 are connected to each other.

Meanwhile, the upper hatch 242 opens the upper portion of the house entrance 220 by allowing the lower end portion of the upper hatch 242 to be pivoted about an upper end portion of the upper hatch 242, and the lower hatch 244 opens the lower portion of the house entrance 220 by allowing the upper end portion of the lower hatch 244 to be pivoted about a lower end portion of the lower hatch 244. Accordingly, the upper hatch 242 and the lower hatch 244 are pivoted to open the house entrance 220 respectively, so that the internal space S2 of the house 200 and the internal space S1 of the vehicle 100 may be connected to each other.

Meanwhile, as shown in FIG. 4, the connection system for a house and a vehicle according to an exemplary embodiment of the present invention is provided so that the upper hatch 242 and the lower hatch 244 are disposed to be inserted into the upper portion and the lower portion of the house entrance 220, respectively. The upper hatch 242 and the lower hatch 244 are slid outwards to protrude from the house 200 and thus are connected to the top portion 160 and the bottom portion 190 of the vehicle 100, respectively.

A solid line indicates a state in which the upper hatch 242 and the lower hatch 244 protrude from the house 200, and a dotted line indicates a state in which the upper hatch 242 and the lower hatch 244 are inserted into the house 200. Meanwhile, the upper hatch 242 and the lower hatch 244 have a pump or the like connected at one side thereof, respectively, to allow them to move to the inside or outside of the house according to the pressure change of the pump, or have a guide rail or the like mounted inside the house to allow them to move to the inside or outside of the house by the guide rail, a motor, or the like.

Furthermore, when the house 200 and the vehicle 100 are connected to each other, the upper hatch 242 and the lower hatch 244 are slid outwards to protrude from the house 200, and thus connected to the top portion 160 and the bottom portion 190 of the vehicle, respectively. Accordingly, it is possible to form a passage through which the internal space of the house and the internal space of the vehicle are connected to each other.

As shown in FIG. 4, when the lower hatch 244 slides outwards to protrude from the house 200, the lower hatch 244 is connected to the bottom portion 190 of the vehicle 100 so that floor surfaces of the internal spaces of the vehicle 100 and the house 200 are continuously connected to each other. The lower hatch 244 is connected to the bottom portion 190 of the vehicle 100 so that the floor surface 180 of the internal space S1 of the vehicle 100 and the floor surface 280 of the internal space S2 of the house 200 are continuously connected, whereby a hooking jaw structure is not formed between the floor surface 180 of the internal space S1 of the vehicle 100 and the floor surface 280 of the internal space S2 of the house 200. Therefore, there is an advantage that it is convenient when a passenger or a resident enters and exits between the vehicle and the house. Furthermore, there is an advantage that it is convenient to carry goods, because the wheels are not caught when equipment such as a cart or the like is used.

Meanwhile, as shown in FIG. 2 and FIG. 3, a connection system for a house and a vehicle according to an exemplary embodiment of the present invention is configured so that the door 140 of the vehicle 100 is opened or closed in a butterfly type, and the upper hatch 242 is coupled to the door 140 of the vehicle 100 in a state where the door 140 of the vehicle 100 is opened. The butterfly type door 140 of the vehicle 100 is provided with a rotation shaft at a top portion or a loop of the vehicle 100 so that a lower end portion of the door 140 of the vehicle 100 is pivoted about the rotation shaft to open the vehicle entrance 120. Alternatively, the rotation shaft is provided in a front pillar (or A pillar) of the vehicle 100, so that the lower end portion of the door 140 of the vehicle 100 may be pivoted about the pivot shaft to open the vehicle entrance 120.

As shown in FIG. 2, when the door 140 of the vehicle 100 is opened, the upper hatch 242 is coupled to an external side 144 of the door 140 of the vehicle 100. The upper hatch 242 is connected to the external side surface 144 of the door 140 of the vehicle 100 so that an upper portion of the passage through which the internal space S2 of the house 200 and the internal space S1 of the vehicle 100 are connected to each other is shut off from the outside.

As shown in FIG. 3, the upper hatch 242 has a groove 245 recessed into the house 200, and an internal portion of the upper hatch 242 is connected to the door 140 of the vehicle 100 in a state that the door 140 of the vehicle 100 is opened. Referring to FIG. 3, the upper hatch 242 is formed with a groove 245 recessed into the house 200. Thus, the upper hatch 242 is recessed into the house 200, so that the door 140 of the vehicle 100 may be mounted on the internal side of the upper hatch 242. In the instant case, the upper hatch 242 slides through the guide rail and thus connected to the door 140 of the vehicle 100. The upper hatch 242 is mounted at a point of a dotted line before the vehicle 100 and the house 200 are connected to each other, and the upper hatch 242 slides in a state where the door 140 of the vehicle 100 is opened and thus is mounted at a point of a solid line when the vehicle 100 and the house 200 are connected to each other.

As shown in FIG. 4, a connection system for a house and a vehicle according to an exemplary embodiment of the present invention is configured so that the door 140 of the vehicle 100 slides forwards and backwards with respect to a longitudinal direction of the vehicle to open or close the vehicle entrance 120, and the upper hatch 242 is coupled to the top portion 160 of the vehicle 100 in a state that the door 140 of the vehicle 100 is opened. The upper hatch 242 is connected to the top portion 160 of the vehicle 100, such as a loop or the like, forming a passage through which the internal space S1 of the vehicle 100 and the internal space S2 of the house 200 are connected to each other.

Furthermore, as shown in FIG. 5, a connection system for a house and a vehicle according to an exemplary embodiment of the present invention is configured so that the door 140 of the vehicle 100 slides upward and downward with respect to the vertical direction of the vehicle 100 to open or close the vehicle entrance 120, and the upper hatch 242 is coupled to the top portion 160 of the vehicle 100 in a state that the door 140 of the vehicle 100 is opened. The upper hatch 242 is connected to the top portion 160 of the vehicle 100 when the door 140 of the vehicle 100 slides upward with respect to the vertical direction to open the vehicle entrance 120, forming a passage through which the internal space S1 of the vehicle 100 and the internal space S2 of the house 200 are connected to each other.

Meanwhile, as shown in FIG. 6, a connection system for a house and a vehicle according to an exemplary embodiment of the present invention further includes an integrated control unit 300 having a list of vehicles 100 accessible to the house 200 to perform authentication for the vehicle 100 accessing the house, and performing control so that the hatch 240 and the door 140 of the vehicle 100 are connected to each other when the vehicle 100 is authenticated.

Although the integrated control unit 300 is provided in the house 200 in FIG. 6, the integrated control unit 300 is provided in the external server to control the vehicle 100, the house entrance 220, and the hatch 240 through the wireless communication.

The integrated control unit 300 according to an exemplary embodiment of the present invention may be implemented via a non-volatile memory configured to store algorithm configured to control operations of various components of the vehicle and the house or data relating to software instructions executing the algorithm, and a processor configured to perform operations described below using data stored in the memory. Here, the memory and the processor may be implemented as separate chips. Alternatively, the memory and the processor may be integrated with each other as a single chip. A processor may take the form of one or more processors.

As shown in FIG. 6, the integrated control unit 300 is provided in the house 200 to control the vehicle 100, the house entrance 220, and the hatch 240 through communication, whereby the internal space of the vehicle 100 and the internal space of the house 200 are connected to each other. The integrated control unit 300 is provided with a list of vehicles 100 accessible to the house 200, to determine whether the vehicle 100 accessing the house 200 is authorized to connect to the house 200. For example, it is determined whether the vehicle 100 is authorized to connect to the house 200 using the license plate of the vehicle accessing the house 200, which is captured through a camera sensor C or the like, or the vehicle is authorized to connect to the house 200 through communication with the vehicle. When the authenticated vehicle 100 accesses the house, after the house entrance 220 is opened and the vehicle 100 is parked, the door 140 of the vehicle 100 and the hatch 240 of the house 200 are controlled so that the internal space of the vehicle 100 and the internal space of the house 200 are connected to each other. As a result, when a vehicle is not authorized to connect to the house, the vehicle is not connected to the house. This has the advantage of securing the security of the house. As described above, the integrated control unit may be provided in the external server so that the internal space of the vehicle and the internal space of the house are connected to each other.

As shown in FIG. 6, a connection system for a house and a vehicle according to an exemplary embodiment of the present invention further includes an integrated control unit 300 designating a position P in which the vehicle is disposed on a side of the house entrance 220 so that the internal space of the vehicle 100 and the internal space of the house 200 are connected to each other, and performing control so that the hatch 240 and the door 140 of the vehicle 100 are connected to each other when the authenticated vehicle 100 is disposed in the designated position P.

The integrated control unit 300 determines whether the authenticated vehicle 100 is correctly positioned at the designated position P via a connected camera sensor C or the like. Accordingly, when internal spaces of the vehicle 100 and the house 200 are connected to each other, it is possible to avoid the risks that the vehicle is not parked at the correct position and thus the door 140 of the vehicle 100 and the hatch 240 of the house 200 interfere with each other so that the door 140 is not open or the door 140 of the vehicle 100 and the hatch 240 of the house 200 are damaged.

According to a connection system for a house and a vehicle of the present invention, when the vehicle is parked on a side of the house entrance, the internal space of the vehicle and the internal space of the house may be connected to each other.

There is an advantage that the internal space of the vehicle is connected to the internal space of the house, forming a new space having a new function.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A connection system for a house and a vehicle, the connection system comprising:
   a vehicle door provided in the vehicle to selectively open a vehicle entrance through which a passenger enters or exits the vehicle and allowing an internal space of the vehicle to be exposed into the house when the vehicle is authenticated from the house and; and
   a connection member provided in a house entrance on a side wall of the house to selectively couple the house entrance and the vehicle entrance with each other so that the internal space of the vehicle and an internal space of the house are connected to each other when the vehicle door of the authenticated vehicle is opened in a side of the house entrance,
   wherein the connection member comprises:
      an upper hatch operably provided in an upper portion of the house entrance; and
      a lower hatch operably provided in a lower portion of the house entrance,
   wherein the upper hatch is configured to be selectively coupled to a top portion of the vehicle and the lower hatch is configured to be selectively coupled to a bottom portion of the vehicle to connect the internal space of the vehicle and the internal space of the house each other,
   wherein first ends of the upper hatch and the lower hatch are pivotally connected to the house,
   wherein a second end of the upper hatch is coupled to the top portion of the vehicle when the second end of the upper hatch is pivoted with respect to the first end of the upper hatch to open the upper portion of the house entrance,
   wherein a second end of the lower hatch is coupled to the bottom portion of the vehicle when the second end of the lower hatch is pivoted with respect to the first end of the lower hatch to open the lower portion of the house entrance, and
   wherein the vehicle door is configured to be opened in a butterfly type, and the upper hatch is coupled to the vehicle door in a state that the vehicle door is opened.

2. The connection system of claim 1, wherein the upper hatch is coupled to an external surface of the vehicle door in a state that the vehicle door is opened.

3. A connection system for a house and a vehicle, the connection system comprising:
   a vehicle door provided in the vehicle to selectively open a vehicle entrance through which a passenger enters or exits the vehicle and allowing an internal space of the vehicle to be exposed into the house when the vehicle is authenticated from the house and; and
   a connection member provided in a house entrance on a side wall of the house to selectively couple the house entrance and the vehicle entrance with each other so that the internal space of the vehicle and an internal space of the house are connected to each other when the vehicle door of the authenticated vehicle is opened in a side of the house entrance,
   wherein the connection member comprises:
      an upper hatch operably provided in an upper portion of the house entrance; and
      a lower hatch operably provided in a lower portion of the house entrance,
   wherein the upper hatch is configured to be selectively coupled to a top portion of the vehicle and the lower hatch is configured to be selectively coupled to a bottom portion of the vehicle to connect the internal space of the vehicle and the internal space of the house each other, and
   wherein the upper hatch has a groove, and the groove of the upper hatch is configured to be coupled to the vehicle door in a state that the vehicle door is opened.

4. The connection system of claim 3,
   wherein the upper hatch is slidably mounted into the house, and
   wherein the groove of the upper hatch is coupled to the vehicle door in a state that the vehicle door is opened, when the upper hatch slides toward the vehicle door.

5. The connection system of claim 3, wherein a first end of the lower hatch is pivotally connected to the house, and a second end of the lower hatch is configured to be selectively coupled to the bottom portion of the vehicle.

* * * * *